United States Patent [19]

Walker, Jr., deceased

[11] Patent Number: 5,165,453
[45] Date of Patent: Nov. 24, 1992

[54] CONDUIT CONTAINMENT SYSTEM

[75] Inventor: William S. Walker, Jr., deceased, late of Pegram, Tenn., by Virginia L. Walker, attorney in Fact

[73] Assignee: Harsco Corporation, Wormleysburg, Pa.

[21] Appl. No.: 704,951

[22] Filed: May 23, 1991

[51] Int. Cl.⁵ .................. F16L 55/00; H02G 3/00
[52] U.S. Cl. ............................ 138/104; 138/92; 138/108; 138/155; 138/157; 138/159; 138/100; 138/103; 174/101; 174/68.3
[58] Field of Search .............. 138/36, 92, 100, 102, 138/103, 104, 105, 108, 155, 156, 157; 174/68.3, 99 R, 101

[56] References Cited

U.S. PATENT DOCUMENTS

| | | | |
|---|---|---|---|
| 278,627 | 5/1883 | Taafe | 174/99 R |
| 319,420 | 6/1885 | Nevius | 138/108 |
| 799,320 | 9/1905 | Franks | 138/157 |
| 1,987,407 | 1/1935 | Lundy | 138/157 |
| 3,570,546 | 3/1971 | Jackson | 174/101 |
| 3,761,603 | 9/1973 | Hays | 138/157 |
| 3,938,767 | 2/1976 | Norris | 174/68.3 |
| 4,040,449 | 8/1977 | Butler | 138/155 |
| 4,077,434 | 3/1978 | Sieckert | 138/156 |
| 4,105,051 | 8/1978 | Uisentin | 138/157 |
| 4,258,515 | 3/1981 | Owen | 138/104 |
| 4,276,332 | 6/1981 | Castle | 174/68.3 |
| 4,349,220 | 9/1982 | Carroll | 138/155 |
| 4,398,564 | 8/1983 | Young | 138/155 |
| 4,990,722 | 2/1991 | Navazo | 174/101 |

FOREIGN PATENT DOCUMENTS

| | | | |
|---|---|---|---|
| 3005585 | 9/1981 | Fed. Rep. of Germany | 174/68.3 |
| 517209 | 1/1940 | United Kingdom | 174/68.3 |

*Primary Examiner*—Philip R. Coe
*Assistant Examiner*—Terrence R. Till
*Attorney, Agent, or Firm*—Kerkam, Stowell, Kondracki & Clarke

[57] ABSTRACT

A secondary containment system for conduits, pipes and electric cables includes a plurality of separate duct sections connected in end-to-end relation to provide an electrically insulating fluid tight system. Each duct section includes a pair of generally Z-shaped structural members formed from a fiber reinforced plastic material with each structural member including top and bottom flanges for supporting a removable top cover panel and a rigidly joined bottom panel. The structural member top flanges are preferably shaped to deflect the top cover panel to present an outwardly convex top surface to prevent the collection of condensate and other fluids.

14 Claims, 2 Drawing Sheets

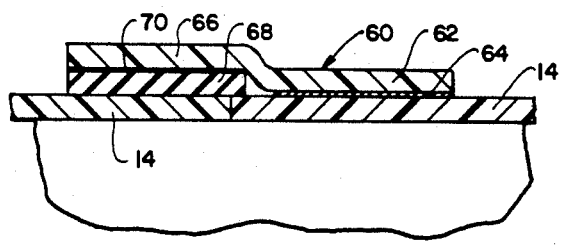
FIG. 4
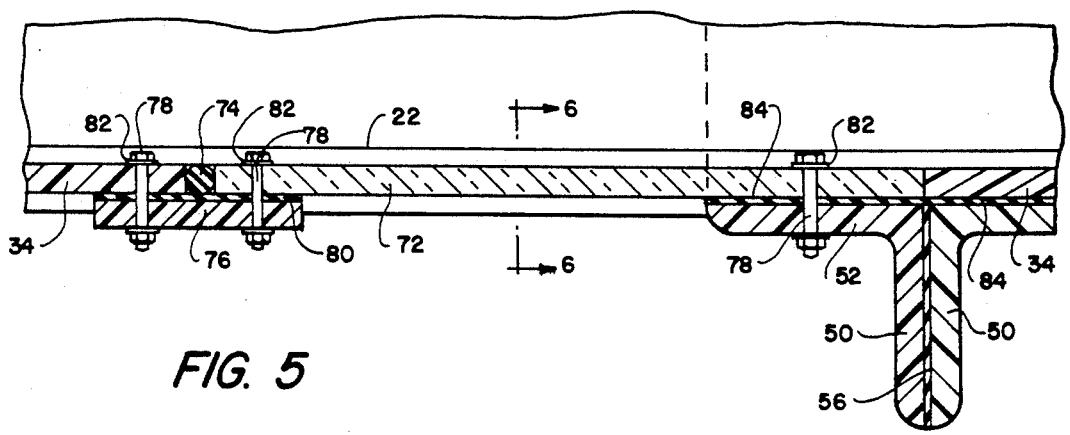
FIG. 5
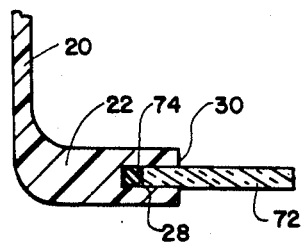
FIG. 6
FIG. 7
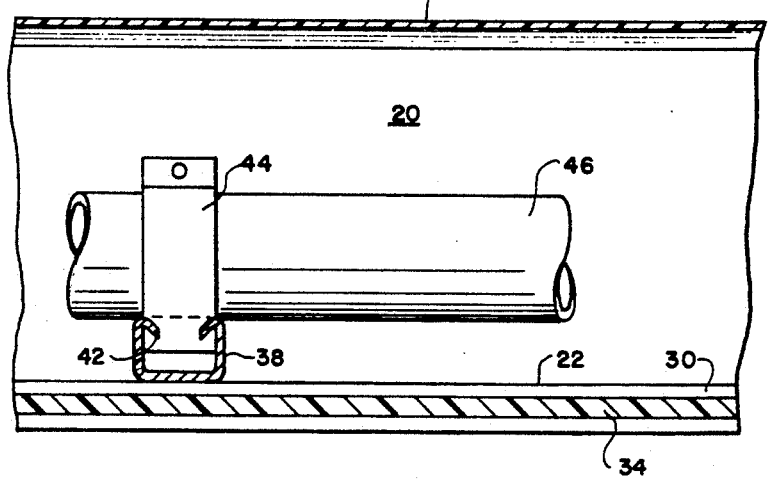

CONDUIT CONTAINMENT SYSTEM

BACKGROUND OF THE INVENTION

This invention relates to conduit containment systems and more particularly to an improved duct system for containing and supporting pipes, conduits, cables and the like.

It is normal practice to support electrical cables and wiring systems, conduits, pipes, tubes and the like, hereinafter sometimes referred to collectively as conduits, in or on a continuous support system, particularly in large buildings and industrial installations. In the past, these systems have frequently been in the form of open racks or trays, usually referred to as ladders, with the conduits being supported on and secured to the cross members or rungs of the ladder. Such ladder structures conventionally have been constructed of metal, usually galvanized steel, although the use of lightweight metal extrusions and fiber reinforced plastic (FRP) materials have also been used. Examples of such ladders may be found in U.S. Pat. No. 3,791,613 to Nollen; U.S. Pat. No. 3,938,767 to Norris; U.S. Pat. No. 4,319,724 to Bradbury and U.S. Pat. No. 4,802,643 to Uys.

The open construction of the prior art ladder support systems inherently subjected the conduits to moisture and other corrosive substances, particularly in industrial applications, utility tunnels and the like and exposed the supported conduits to mechanical or physical contact and damage. Further, personnel and equipment may be exposed to electrical shock or to injury or contamination by dangerous fluids as a result of damage to cables or conduits supported by such open trays or ladders. Accordingly, safety regulations may require secondary containment for such conduits, particularly for high voltage cables or pipes containing steam or corrosive or hazardous fluids. While secondary containment systems provide increased safety over open ladder structures, known systems generally have not provided adequate corrosion or mechanical impact resistance and have not provided the desired protection from electrical shock or contamination. It is accordingly, a primary object of the present invention to provide an improved secondary containment system or duct for use as a secondary containment for such conduits to protect personnel and equipment from hazards resulting from damaged electrical conductors or fluid conduits supported in the system.

Another object is to provide an improved secondary containment system formed from an electrically insulating material which will provide maximum resistance to corrosion damage and protection from electrical shock.

Another object is to provide such a secondary containment system which provides a completely sealed duct for containing fluids or the like which might escape from damaged conduits within the system.

Another object is to provide such system produced from synthetic resin material including separately formed fiberglass reinforced plastic structural members and panel members rigidly assembled to form independent duct sections which are joined together in end-to-end relation to provide an elongated secondary containment system of any desired length.

Another object is to provide such a system having a removable top panel to provide convenient access to the interior of the system for repair and maintenance, with the top panel being outwardly convex to minimize collection and ponding of condensate or other fluids on the top cover.

Another object is to provide such a system made up of a plurality of end-to-end connected duct sections wherein individual sections may be removed to provide access to the conduits passing therethrough or to enable replacement of damaged duct sections.

In the attainment of the foregoing and other objects and advantages, an important feature resides in providing a duct system for secondary containment of fluid conduits, electrical cables or the like, and comprising a plurality of independent duct sections adapted to be connected in end-to-end relation. Each duct section includes a pair of elongated structural elements produced from fiber reinforced plastic (FRP) material, for example, glass fiber reinforced polyester or vinyl ester thermoset resins, produced by a pultrusion process to provide maximum resistance to corrosion and thermal shock and to withstand substantial mechanical impact. The two structural elements are identical and arranged in mirror image relation, one on each side of the duct. Each structural element has a substantially Z-shaped cross section including a generally planar central web defining one sidewall of the duct, an inwardly directed bottom leg or flange extending along the full length of the web at its bottom edge and an outwardly directed top leg or flange extending along the full length of the web at its top edge. A continuous slot or groove is formed in the inwardly directed edge of the bottom flange to provide a tongue and groove joint with the side edge of a generally rectangular flat bottom panel. The bottom panel may include a section of transparent plastic sheet to permit viewing the interior of the duct system through the bottom wall.

A top cover, preferably of fiber reinforced plastic sheet, extends over and closes the open top of the trough defined by the transparent bottom wall and the two structural side members. Insulative fastener members extending through the top flanges and the top cover rigidly, but removably, secure the cover in position. The top surface of the top flange is inclined downwardly slightly with respect to the plane of the open top, and the top panel is bowed or sufficiently flexible so that the fastener members draw its edge portions down into contact with the flanges causing the center of the top cover to bow upwardly and produce a naturally draining contour to eliminate any low spots which could collect condensate or other fluids. A suitable sealing gasket member is provided between the top cover panel and the top flanges to provide a fluid tight seal. Also, suitable means such as adhesive bonding and plastic riveting provide a fluid tight seal at the tongue-and-groove joint between the bottom flanges and the bottom panel.

Each section of the duct system is provided with an outwardly extending flange at each end, and through openings in the flange permit bolting of adjacent sections in end-to-end relation to form a duct of the desired length. Suitable gasket means are provided to form a fluid tight joint between adjacent sections in the assembled duct system. Bridge means extending between the two FRP structural members may also be provided at spaced intervals along the respective duct sections to support the weight of conduits within the system. Such bridge members may be a length of an extruded or pultruded FRP shape having its opposed ends connected one to the bottom flange on each FRP structural member.

Other features and advantages of the invention will be apparent from the detailed description contained hereinbelow, taken in conjunction with the drawings, in which:

FIG. 4 is an enlarged fragmentary sectional view taken along line 4—4 of FIG. 1;

FIG. 5 is an enlarged fragmentary sectional view taken along line 5—5 of FIG. 1;

FIG. 6 is a fragmentary sectional view taken along line 6—6 of FIG. 5, and

FIG. 7 is a fragmentary sectional view taken along line 7—7 of FIG. 2.

Figure 1:
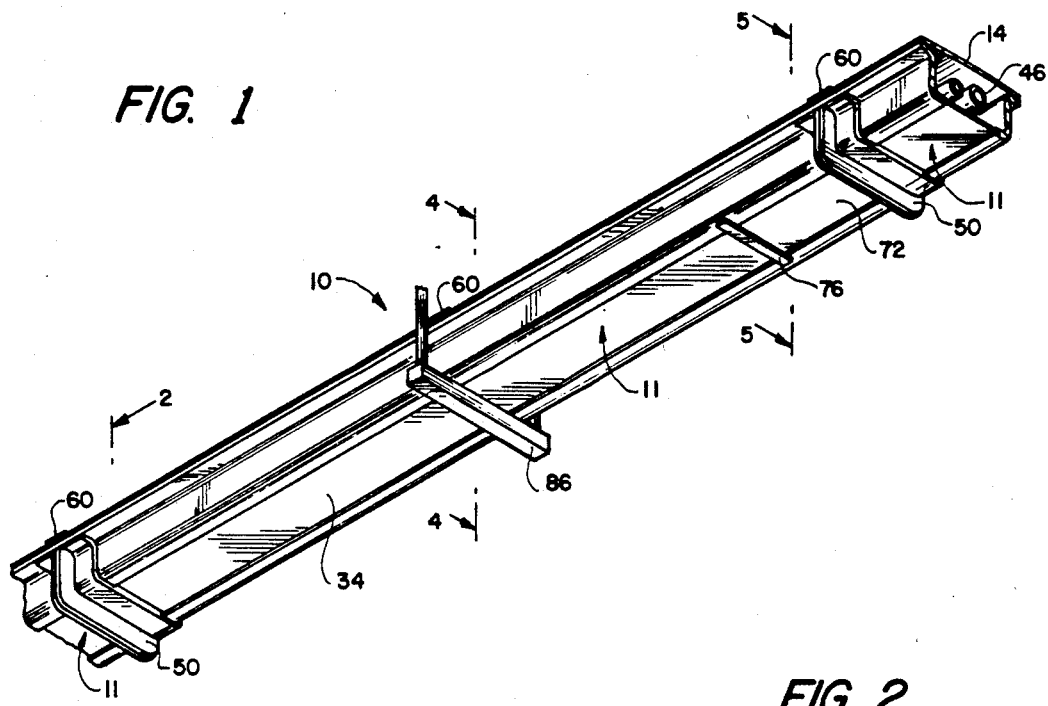
FIG. 1 is an isometric view of a section of a secondary containment system embodying the present invention.
Figure 2:
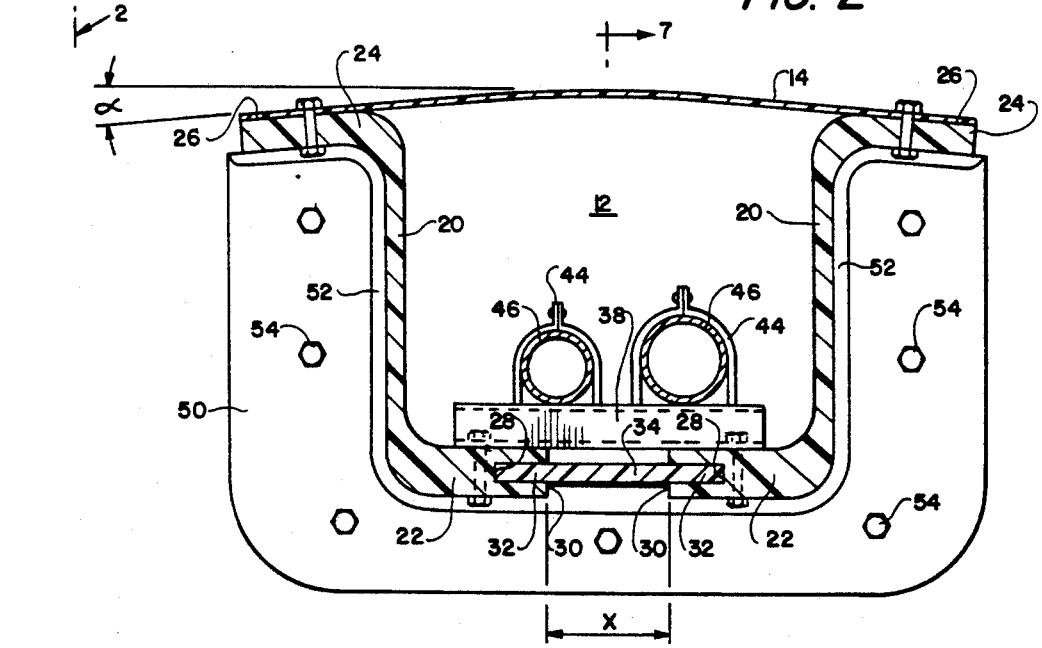
FIG. 2 is an enlarged sectional view taken on line 2—2 of FIG. 1.
Figure 3:
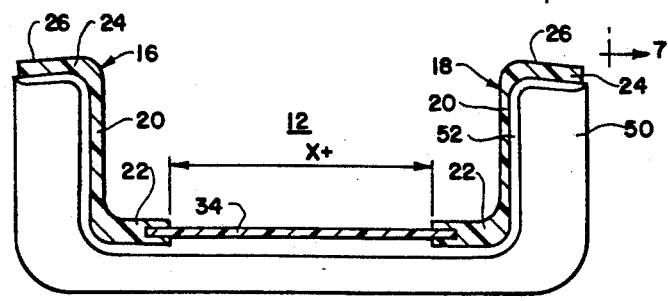
FIG. 3 is a view similar to FIG. 2 with certain elements omitted for clarify.

Referring now to the drawings in detail, a segment of a conduit containment system embodying the present invention is designated in FIG. 1 by the reference numeral 10 and comprises a plurality of separate lengths or sections 11 of duct adapted to be joined in end-to-end relation to provide a closed duct of any desired length. Each section 11 includes an open topped tray or trough portion 12 and a removable top cover 14. The trough is made up of two side members, preferably pultruded FRP structural shapes 16, 18, with side members 16, 18 being substantially identical and arranged in spaced mirror image relation. Only side member 16 will therefore be described, it being understood that the description applies equally to member 18. Thus, side member 16 includes a generally flat, vertically extending web portion 20 defining the sidewall of the tray 12, with an integrally formed inwardly directed bottom flange 22 extending along its bottom edge and an outwardly directed top flange 24 extending along its top edge. The top flange 24 has a top surface 26 which is inclined downwardly at an angle α with respect to the horizontal top plane of the open tray for purposes to be explained more fully hereinbelow. At the end of the containment system, suitable end panels 21 may be provided with sealed access openings (not shown) through which the conduits supported within the containment system may pass.

Bottom flange 22 has a generally rectangular groove 28 formed in its inwardly directed edge 30, with the groove 28 being dimensioned to receive one longitudinal side edge 32 of a generally flat bottom panel 34. A suitable adhesive and plastic riveting are employed to firmly join and form a fluid tight seal between the panel edges 32 and flanges 22 within the groove 28 to complete the open topped tray 12.

It should be understood that, while the containment system will normally extend in a horizontal or generally horizontal direction, all or portions of a complete system may be installed in an inclined attitude or may include vertically running sections. Accordingly, use of the terms vertical, horizontal, top, bottom, and sides will be understood to refer to the duct system when disposed in a horizontal attitude with the flanges 22 and panel 34 defining the bottom of the open elongated tray portion.

In order to strengthen the bottom of the tray, and to maintain desired space between conduits extending therethrough and to maintain such conduits spaced above the bottom panel, bridge members 38 are provided at spaced intervals along the length of the tray 12. The bridge members 38 have their opposed ends secured by bolts 40 and suitable sealing gaskets, not shown, to the inner top surface of the respective bottom flanges 22. Bridge members 38 may be of any suitable configuration such as an open channel and preferably are formed from a fiber reinforced plastic material by a pultrusion process. The channel shaped bridge members 38 may have their edge portions turned inward to form retaining ledges 42 for engaging cooperating slots in pipe strips 44 for securing conduits 46 within the duct system.

Each trough section 11 is provided at its opposed ends with an outwardly directed external flange 50. Flanges 50 are preferably molded from a fiber reinforced plastic material and include an angle portion 52 rigidly joined to the external surface of the structural member 16, 18 as by continuous bonding and plastic riveting in a manner known in the art. Bolts 54 extend through openings in flanges 50 for connecting the duct sections in end-to-end relation in the system, and gaskets 56 provide a fluid tight joint between the bolted flanges. Also, resilient gaskets 58 are provided between the end flange and the bottom panel 34 at each joint.

The top cover panel 14 may be shorter than the respective duct sections 11 to facilitate removal and replacement of the covers to provide access to the interior of the system. For example, the top cover panel 14 may be in sections one half the length of each respective segment 11. Also, as best seen in FIG. 4, each cover panel section 14 is provided at one end with a reinforcing and sealing flange assembly including an offset molded fiber reinforced plastic bar 60 having one side portion 62 rigidly joined by bonding, as indicated at 64, to the top surface of the underlying panel member 14. The opposite side portion 66 of the reinforcing member 60 is offset upwardly and has a resilient sealing gasket or pad 68 firmly joined by bonding, as indicated at 70, to its bottom surface. When assembled on the top of the open tray 12, the offset portion 66 and the resilient gasket 68 overlying the top surface of the adjacent panel member 14 cooperate to reinforce and seal the joint between adjacent abutting ends of adjacent panels 14.

Referring now to FIGS. 5 and 7, transparent viewing windows may be provided in the bottom of the secondary containment system. This is accomplished by replacing a portion, preferably one end portion, of at least selected ones of the fiber reinforced plastic bottom panels 34 with a transparent plastic sheet 72. Sheet 72 has a thickness corresponding to that of fiber reinforced plastic sheet 34 and a width, transversely of the system, such that its side edges are received within the grooves 28 in the bottom flanges 22. The panels 22 are preferably joined to the flanges 22 by bonding, and a resilient O-ring gasket 74 received within the grooves 28 provides a secondary seal.

The O-ring seal 74 may also be provided between adjacent ends of panels 34 and 72 at locations intermediate the ends of the respective duct sections 11, as shown in FIG. 5. Such joints are provided with a reinforcing plastic bar 76 extending therebeneath between opposing edges 30 of the respective flanges 22 and bolts 78 extending through the bar 76 and panels 34 and 72 provide a rigid joint. A resilient gasket 80 further seals the joint between the two panels. Resilient washers 82 are provided beneath the heads of bolts 78 to seal the bolt openings.

When the viewing window is provided at the end of a duct section 11, the transparent panel 72 may be bolted directly to angle portion 52 of the connector flange 50, with a sealing gasket element 80 providing a fluid seal between the bottom surface of the transparent panel and the top surface of the angle portion 52. Resilient washers 82 are provided beneath the heads of the bolts 78 to seal the bolt openings. It is believed apparent that any suitable support means such as the hangar bracket 86 may be employed to support the containment system and the conduit supported therein.

In the preferred embodiment of the invention described above, only non-metal elements are employed in the system, however, in non-electrical applications stainless steel elements may be employed. Thus, essentially all exposed elements of the containment system are of electrical insulating material to minimize electrical shock hazard to personnel and equipment. Further, the system is completely sealed and may be constructed so as to provide adequate strength to support a load equal to that which would result from the trough 12 being filled with fluid upon rupture of a conduit 46.

Since the containment system is formed from non-corrosive material, it is essentially maintenance free. Further, the unique arched cover for the system eliminates dust entry, ponding or collection of fluids on the top of the system, which fluids could result in corrosion damage and leakage into the interior of a containment system formed from conventional metal components. Nevertheless, the system provides ready access to the interior for maintenance without requiring disassembly of the support structure and the transparent window provided in the bottom enables easy visual inspection of the system.

The cover 14 is bowed so that the angle of the top surface 26 of the flanges 24 is preferably within the range of about 2° to 10°, and more preferably about 5°. It has been found that deflecting the side edges of the top panel 11, downward by this amount assures an upwardly convex top surface without placing undue stress in the structure and without presenting material assembly problems.

While a preferred embodiment of the invention has been disclosed and described in detail, it is not intended that the invention be so limited, but rather it is intended to include all embodiments which would be apparent to one skilled in the art and which come within the spirit and scope of the invention.

What is claimed is:

1. In a secondary conduit containment system of the type including an elongated trough having opposed sidewalls, a bottom wall extending between and joining said sidewalls, and an open top, the improvement comprising, a pair of generally Z-shaped structural members formed from a pultruded fiber reinforced plastic material, said structural members each including an elongated central web having top and bottom edge portions defining one of said sidewalls, a top flange projecting outwardly from the top edge portion of said central web, and a bottom flange projecting inwardly from the bottom edge portion of said central web, said bottom flange terminating in a free edge having a groove formed therein along its full length, a substantially flat generally rectangular plastic bottom panel having opposed longitudinal side edges disposed one within said groove in each said bottom flange and cooperating therewith to define said bottom wall, means rigidly joining said bottom panel and said bottom flanges within said grooves and forming a fluid tight joint therebetween, an elongated generally rectangular plastic top cover panel extending over said open top and said top flanges, and fastener means extending through said top flanges and said top cover panel for releasably retaining said cover panel on said trough to close said open top and form a sealed, fluid tight, electrically insulating containment system.

2. The secondary containment system defined in claim 1 wherein said top flange includes a top surface inclined downwardly at an angle within the range of about 2 to 10 degrees and said top cover panel is a planar sheet secured to said top surface.

3. The secondary containment system defined in claim 2 wherein said generally Z-shaped structural members comprise fiberglass reinforced plastic structural shapes and wherein said end flanges are molded separately and subsequently rigidly joined to the external surface of said structural members.

4. The secondary containment system defined in claim 3 wherein said generally Z-shaped structural members are substantially identical and arranged in mirror image relation with respect to one another.

5. The secondary containment system defined in claim 4, further comprising bridge means mounted on and extending between said bottom flanges within said trough and in spaced relation to said bottom panel for supporting conduits within said containment system.

6. The secondary containment system defined in claim 5, wherein said top flange includes a top surface inclined downwardly and outwardly from said top edge, said top cover panel normally being a substantially planar fiber reinforced plastic sheet and being joined to the top surface of said top panels by fasteners which deflect the side edges of said top panel downward and thereby deflect the center portion of said top panel upward to provide a naturally draining surface for the top panel.

7. The secondary containment system defined in claim 6, wherein said top surface is inclined downwardly at an angle within the range of about 2 to 10 degrees.

8. The secondary containment system defined in claim 7, further comprising an inspection window in at least selected ones of the trough sections, said inspection window comprising a rigid transparent plastic sheet defining at least a portion of said bottom panel.

9. The containment system defined in claim 1, wherein said elongated trough comprises a plurality of trough sections secured together in end-to-end relation to form a duct of predetermined length, and wherein each said trough section comprises a transversely extending end flange on each end thereof and projecting radially outward therefrom, and removable fastener means extending through said end flanges releasably joining adjacent trough sections in said end-to-end relation.

10. The secondary containment system defined in claim 9, further comprising first sealing gasket means disposed between said end flanges on said adjacent trough sections and forming a fluid tight joint therebetween and second sealing gasket means between said top flanges and said top cover panel to form a fluid tight joint therebetween.

11. The secondary containment system defined in claim 10 further comprising bridge means mounted on and extending between said bottom flanges within said trough and in spaced relation to said bottom panel for supporting conduits within said containment system.

12. The secondary containment system defined in claim 11, further comprising bridge means mounted on and extending between said bottom flanges within said trough for supporting conduits extending through said containment system in spaced relation to said bottom panel, said top flanges and said top cover panel to form a fluid tight joint therebetween.

13. The secondary containment system defined in claim 1, wherein said top flange includes a top surface inclined downwardly and outwardly from said top edge, said top cover panel normally being a substantially planar fiber reinforced plastic sheet and means for joining said plastic sheet to the top surface of said top panels so as to deflect the side edges of said top panel downward and thereby deflect the center portion of said top panel upward to provide a naturally draining surface for the top panel.

14. The secondary containment system defined in claim 13, further comprising an inspection window in at least selected ones of the trough sections, said inspection window comprising a rigid transparent plastic sheet defining at least a portion of said bottom panel.

* * * * *

UNITED STATES PATENT AND TRADEMARK OFFICE
CERTIFICATE OF CORRECTION

PATENT NO. : 5,165,453

DATED : November 24, 1992

INVENTOR(S) : William S. Walker, Jr.

It is certified that error appears in the above-identified patent and that said Letters Patent is hereby corrected as shown below:

Col. 7, line 13 (Claim 12, line 6) after "panel." (first occurrence) delete "said top flanges and said top cover panel to form a fluid tight joint therebetween."

Signed and Sealed this

Eighteenth Day of January, 1994

Attest:

BRUCE LEHMAN

*Attesting Officer*     *Commissioner of Patents and Trademarks*